Patented Oct. 28, 1930

1,780,008

UNITED STATES PATENT OFFICE

MAX ENGELMANN, OF WILMINGTON, DELAWARE, ASSIGNOR TO E. I. DU PONT DE NEMOURS & COMPANY, OF WILMINGTON, DELAWARE, A CORPORATION OF DELAWARE

DISINFECTANT COMPOSITION

No Drawing. Application filed May 19, 1928. Serial No. 279,215.

This invention has to do with new disinfectant materials and particularly the disinfectants used for the treatment of seed and plant diseases. In treating seeds with disinfecting materials for the control of disease, or in spraying foliage with disinfectant sprays, it is well known that if the disinfectant is used in too high concentration there is danger of injury to the seeds or plants. Certain disinfecting compositions, particularly those with a very high toxicity to disease organisms, also have a somewhat increased toxicity to the seed and plant tissues and must therefore be used with particular care.

There is a class of organic mercury compounds which is very effective in the control of disease organisms which may be represented by the expression R—Hg—X, where R is an organic radicle, preferably an alkyl hydrocarbon radicle, and X is an acid radicle, preferably a halogen. Many of these compounds are extremely toxic to disease organisms and are very effective as seed and plant disinfectants. Like all such disinfecting materials they may, if used in too high concentration, cause injury to seed and plant tissues.

This invention has as an object the control of diseases of seeds and plants. A further object of my invention is a composition having a concentration sufficient for this purpose, but whose toxicity is not so high as to injuriously affect the seed and plant tissue.

I have discovered that I can greatly reduce the tendency of these materials to cause injury to plant organisms, while still not appreciably reducing their toxicity to disease organisms, if I have present with the disinfectant materials one or more of certain sulfur compounds. The sulfur compounds I have found particularly effective for this purpose are the thiosulfates, such for example as sodium thiosulfate, the sulfites and acid sulfites, soluble sulfide, such for example as sodium sulfide, compounds such as ammonium or potassium sulfocyanate and potassium ethyl xanthate. Some of these salts appear to combine chemically with organic mercury compounds, such for example as ethyl mercuric chloride. I may in some cases form this chemical compound and use this as the active disinfecting material, but I ordinarily prefer to add the salt as such to the mixture, in which case chemical combination may or may not take place. I have found the use of sulfur containing salts, as above indicated, particularly effective in seed disinfectants containing compounds of the type of ethyl mercuric chloride.

By way of description of the compositions comprising my invention, the following illustrative examples are given, but it will be understood that other embodiments exist and may be practiced without departing from the spirit of the invention:

Example 1

A seed disinfectant composition is made containing 1.3 parts of ethyl mercuric chloride, 2.5 parts of sodium thiosulfate and 96.2 parts of tolanite. This composition can be dusted on seeds for the control of seed borne disease or it may be mixed with water and used for the wet treatment of seeds and plants. I prefer, however, to use it in dust form. It will be found to be less toxic to seeds and plants than the corresponding mixture containing no sodium thiosulfate.

Example 2

A seed disinfectant composition is made containing 1 part methyl mercuric iodide mixed with 0.6 parts potassium sulfocyanate, 2 parts lime and 96.4 parts infusorial earth. This mixture may be used for the treatment of seeds and plants for the control of disease.

It is obvious that I may use the materials described above in combination with other disinfecting agents, such for example as other organic mercury compounds or inorganic compounds of mercury, etc.

As many apparently widely different embodiments of this invention may be made without departing from the spirit and scope thereof, it is to be understood that I do not limit myself to the specific embodiments thereof except as defined in the appended claims.

I claim:

1. A disinfectant for the control of seed and plant diseases, comprising an organic mercury compound of the type R—Hg—X in which R is an alkyl group and X an acid group, together with a sulfur containing salt taken from the group comprising thiosulfates, sulfites, acid sulfites, sulfides, thiocyanates, and alkyl xanthates.

2. A disinfectant for the control of seed and plant diseases, comprising an organic mercury compound of the type R—Hg—X in which R is an alkyl group and X a halogen, together with a sulfur containing salt taken from the group comprising thiosulfates, sulfites, acid sulfites, sulfides, thiocyanates, and alkyl xanthates.

3. A disinfectant for the control of seed and plant diseases, comprising an organic mercury compound of the type R—Hg—X in which R is alkyl group and X is chlorine, together with a sulfur containing salt taken from the group comprising thiosulfates, sulfites, acid sulfites, sulfides, thiocyanates, and alkyl xanthates.

4. A disinfectant for the control of seed and plant diseases, comprising ethyl mercuric chloride, together with a sulfur containing salt taken from the group comprising thiosulfates, sulfites, acid sulfites, sulfides, thiocyanates, and alkyl xanthates.

5. A disinfectant for the control of seed and plant diseases, comprising an organic mercury compound of the type R—Hg—X in which R is an alkyl group and X an acid group, together with a thiosulfate.

6. A disinfectant for the control of seed and plant diseases, comprising an organic mercury compound of the type R—Hg—X in which R is an alkyl group and X a halogen, together with a thiosulfate.

7. A disinfectant for the control of seed and plant diseases, comprising an organic mercury compound of the type R—Hg—X in which R is an alkyl group and X is chlorine, together with sodium thiosulfate.

8. A disinfectant for the control of seed and plant diseases, comprising ethyl mercuric chloride, together with sodium thiosulfate.

9. A disinfectant in dust form for the control of seed and plate diseases, comprising an organic mercury compound of the type R—Hg—X in which R is an alkyl group and X an acid group, together with a sulfur containing salt taken from the group comprising thiosulfates, sulfites, acid sulfites, sulfides, thiocyanates, and alkyl xanthates.

10. A disinfectant in dust form for the control of seed and plant diseases, comprising an organic mercury compound of the type R—Hg—X in which R is an alkyl group and X a halogen, together with a sulfur containing salt taken from the group comprising thiosulfates, sulfites, acid sulfites, sulfides, thiocyanates, and alkyl xanthates.

11. A disinfectant in dust form for the control of seed and plant diseases, comprising an organic mercury compound of the type R—Hg—X in which R is an alkyl group and X is chlorine, together with a sulfur containing salt taken from the group comprising thiosulfates, sulfites, acid sulfites, sulfides, thiocyanates, and alkyl xanthates.

12. A disinfectant in dust form for the control of seed and plant diseases, comprising ethyl mercuric chloride, together with a sulfur containing salt taken from the group comprising thiosulfates, sulfites, acid sulfites, sulfides, thiocyanates, and alkyl xanthates.

13. A disinfectant in dust form for the control of seed and plant diseases, comprising an organic mercury compound of the type R—Hg—X in which R is an organic radicle and X an acid radicle, together with a thiosulfate.

14. A disinfectant in dust form for the control of seed and plant diseases, comprising an organic mercury compound of the type R—Hg—X in which R is an alkyl group and X an acid group, together with a thiosulfate.

15. A disinfectant in dust form for the control of seed and plant diseases, comprising an organic mercury compound of the type R—Hg—X in which R is an alkyl group and X a halogen, together with a thiosulfate.

16. A disinfectant in dust form for the control of seed and plant diseases, comprising an organic mercury compound of the type R—Hg—X in which R is an alkyl group and X is chlorine, together with sodium thiosulfate.

17. A disinfectant in dust form for the control of seed and plant diseases, comprising ethyl mercuric chloride, together with sodium thiosulfate.

In testimony whereof I affix my signature.

MAX ENGELMANN.